United States Patent
Amsden et al.

(10) Patent No.: US 9,492,775 B2
(45) Date of Patent: Nov. 15, 2016

(54) AIR FILTRATION MEDIA, MEDIA CONSTRUCTIONS AND METHODS

(71) Applicants: DONALDSON COMPANY, INC., Minneapolis, MN (US); AHLSTROM CORPORATION, Helsinki (FI)

(72) Inventors: Kristin M. Amsden, St. Paul, MN (US); Kevin R. Schouweiler, Madisonville, KY (US)

(73) Assignees: Donaldson Company, Inc., Minneapolis, MN (US); Ahlstrom Corporation, Helsinki (FI)

(*) Notice: Subject to any disclaimer, the term of this patent is extended or adjusted under 35 U.S.C. 154(b) by 110 days.

(21) Appl. No.: 13/839,915

(22) Filed: Mar. 15, 2013

(65) Prior Publication Data

US 2014/0260137 A1     Sep. 18, 2014

(51) Int. Cl.
  *B01D 46/00* (2006.01)
  *B01D 46/52* (2006.01)
  *B01D 39/18* (2006.01)
  *B01D 39/16* (2006.01)

(52) U.S. Cl.
  CPC ......... *B01D 46/526* (2013.01); *B01D 39/1623* (2013.01); *B01D 39/18* (2013.01); *B01D 46/0023* (2013.01); *B01D 46/525* (2013.01); *B01D 2239/064* (2013.01)

(58) Field of Classification Search
  CPC ... B01D 46/10; B01D 46/521; B01D 46/523
  USPC .......... 55/482, 497–499, 521–522, 529, 502
  See application file for complete search history.

(56) References Cited

U.S. PATENT DOCUMENTS

| | | | |
|---|---|---|---|
| 4,455,237 A | 6/1984 | Kinsley | |
| 7,270,692 B2 | 9/2007 | Gillingham et al. | |
| 7,303,604 B2 | 12/2007 | Gieseke et al. | |
| 7,488,365 B2 | 2/2009 | Golden et al. | |
| 7,959,702 B2 * | 6/2011 | Rocklitz et al. | 55/521 |
| 8,236,082 B2 | 8/2012 | Witsch et al. | |
| 8,241,383 B2 | 8/2012 | Schrage et al. | |
| 2006/0196359 A1 * | 9/2006 | Gillingham et al. | 95/273 |

(Continued)

FOREIGN PATENT DOCUMENTS

| | | |
|---|---|---|
| CN | 1615172 | 5/2005 |
| CN | 1809408 | 7/2006 |

(Continued)

OTHER PUBLICATIONS

International Search Report from PCT/FI2014/050191, corresponding to PDSD, dated Mar. 7, 2014, 2 pages.

(Continued)

*Primary Examiner* — Robert Clemente
*Assistant Examiner* — Karla Hawkins
(74) *Attorney, Agent, or Firm* — Pauly, Devries Smith & Deffner, LLC (57) ABSTRACT

The present invention is directed, in part, to air filtration media, air filtration media packs, air filtration elements, and methods of making air filtration media, media packs, and filtration elements. The air filtration media typically has a fiber composition that is primarily cellulose fibers, the media having a low solidity and low basis weight and being suitable for forming of structured flutes into the media. In certain embodiments a resin is added such as a solvent based resin.

20 Claims, 8 Drawing Sheets

(56) References Cited

U.S. PATENT DOCUMENTS

| | | | |
|---|---|---|---|
| 2008/0022645 | A1 | 1/2008 | Skirius et al. |
| 2010/0319543 | A1 | 12/2010 | Witsch et al. |

FOREIGN PATENT DOCUMENTS

| | | |
|---|---|---|
| CN | 102458604 | 5/2012 |
| CN | 102458606 | 5/2012 |
| JP | 2012036518 | 2/2012 |
| KR | 1099377 | 12/2011 |
| KR | 20120044979 | 5/2012 |
| WO | 2009003119 | 12/2008 |
| WO | 2014144670 | 9/2014 |

OTHER PUBLICATIONS

International Search Report and Written Opinion for PCT/US2014/029179, mailed Oct. 13, 2014 (16 pages).

Buckeye Product Summary, Grade FHP-11 SBSK Wood Pulp, Mar. 8, 2013, Buckeye Technologies, Memphis, TN, 1 page.

International Preliminary Report on Patentability for PCT/US2014/029179 mailed Sep. 24, 2015 (12 pages).

First Search Report from State Intellectual Property Office of People's Republic of China in Application No. 201480014933.4 of Ahlstrom Corporation, dated Mar. 23, 2016, (2 pages).

Notice of Grounds for Rejection from the Korean Intellectual Property Office in Application No. 2015-7028234 of Ahlstrom Corporation, dated May 16, 2016 (8 pages).

\* cited by examiner

AIR FILTRATION MEDIA, MEDIA CONSTRUCTIONS AND METHODS

FIELD OF THE INVENTION

The present invention is directed air filtration media, air filtration media constructions, and methods of making air filtration media.

BACKGROUND OF THE INVENTION

A variety of air filtration media constructions are currently available for use in filter elements designed to remove particulate contaminants from air streams. In particular, a wide range of media constructions have been developed for use in pleated filter elements. In addition to good particulate removal properties, suitable pleated filter media often has high strength, and preserves (or substantially preserves) the flat pleats of media during manufacture, storage and use.

In recent years, improved filter constructions have been created that utilize an alternative to pleated configurations. Specifically, these elements incorporate a series of fluted sheets of media through which air (or another gas) flows in a manner that the air flows from one flute to another as it passes from an upstream ("dirty") side of the filter element to a downstream ("clean") side of the filter element. This gas flow is often called "z-flow", and sometimes referred to as a "z-flow element". Example z-flow elements are disclosed in U.S. Pat. No. 8,241,383, assigned to Donaldson Company, Inc.

In some z-flow constructions, the flutes are characterized by unique shapes that contain features such sharp flute peaks and/or ridges formed in the fluted media between adjacent flute peaks. These z-flow constructions can reduce masking between fluted media and adjacent non-fluted media, which allows for more efficient use of media and increased media packing within specific element volumes. These constructions often also allow for media elements having different upstream and downstream volumes. These improved z-flow constructions with sharp flute peaks and ridges are examples of z-flow media with "structured flutes". The structured flutes can provide improved performance relative to prior flutes that had a standard corrugated structure of undulating media lacking in sharp peaks and defined ridges.

Although z-flow media with structured flutes is desirable for many applications, much of the existing air filtration media can be difficult to form into structured flutes. Also, the media can become degraded (such as from tearing) during formation of the z-flow constructions, or the peaks and ridges (or other structures) in the flutes can fail to adequately retain their shape after forming and/or during use.

Therefore, a need exists for improved filter media which can be readily formed into structured flutes, which provides a desirable level of retention of flute shapes, and is otherwise suitable for use in media and media constructions having flutes with sharp peaks and ridges between peaks, as well as other formed structural elements.

SUMMARY OF THE INVENTION

The present invention is directed, in part, to air filtration media, air filtration media packs, air filtration elements, and methods of making air filtration media, media packs, and filtration elements.

The air filtration media typically has a fiber composition wherein at least 80 percent of the fiber by weight is cellulosic. The air filtration media typically has a solidity of less than 20 percent and a basis weight of less than 45 pounds per 3000 square feet (73.2 grams per square meter).

The air filtration media packs and filtration elements often include a plurality of layers of single facer media, wherein the layer of single facer media includes a fluted sheet, a facing sheet, and a plurality of flutes extending between the fluted sheet and the facing sheet. The flutes have a flute length extending from a first face of the filtration media pack to a second face of the filtration media pack. A first portion of the plurality of flutes is closed to unfiltered air flowing into the first portion of the plurality of flutes. A second portion of the plurality of flutes is closed to unfiltered air flowing out of the second portion of the plurality of flutes. In this manner, air that air passes into one of the first face or the second face of the media pack and out the other of the first face or the second face of the media pack passes through media to provide filtration of the air.

The fluted sheet generally contains repeating internal peaks facing toward the facing sheet and repeating external peaks facing away from the facing sheet. The flutes can include at least one ridge extending along at least a portion of the flute length between adjacent peaks, the ridge comprising a discontinuity in the curvature of the flute between the adjacent peaks. The air filtration media generally has a fiber composition wherein at least 80 percent of the fibers by weight are cellulose fibers, and wherein the air filtration media has a solidity of less than 20 percent and a basis weight of less than 45 pounds per 3000 square feet (73.2 gram per square meter).

The air filtration media packs and filtration elements can, in the alternative, comprise pleated filtration media into which structured flutes have been formed. Such constructions typically do not include layers of facer sheets or plugs at either end of the flutes. The flutes have a flute length extending from a first face of the filtration media pack to a second face of the filtration media pack. The fluted sheet generally contains repeating internal peaks facing toward an adjacent pleat face. The flutes can include at least one ridge extending along at least a portion of the flute length between adjacent peaks, the ridge comprising a discontinuity in the curvature of the flute between the adjacent peaks. The air filtration media generally has a fiber composition wherein at least 80 percent of the fibers by weight are cellulose fibers; and wherein the air filtration media has a solidity of less than 20 percent and a basis weight of less than 45 pounds per 3000 square feet (73.2 gram per square meter).

The above summary of the present invention is not intended to describe each discussed embodiment of the present invention. This is the purpose of the figures and the detailed description that follows.

FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed, in part, to an air filtration media having a high cellulosic fiber concentration, the air filtration media suitable for use with filter elements into which structured flutes have been formed. The invention is also directed to filter constructions, including filter media packs and elements, containing structured flutes. The filter constructions can include fluted media combined with facer sheets, as well pleated media into which flutes have been formed. The filter constructions can include media having structured flutes, including z-flow media with facer sheets and pleated media containing flutes.

Media Composition and Properties

The air filtration media typically has a fiber composition wherein at least 80 percent of the fiber by weight is cellulosic fiber. The air filtration media typically has a solidity of less than 20 percent and a basis weight of less than 45 pounds per 3000 square feet (73.2 grams per square meter).

In various embodiments, the air filtration media contains at least about 50 percent by weight cellulosic fibers. In certain implementations the media contains greater than 60 percent by weight cellulosic fibers, greater than 70 percent by weight cellulosic fibers, greater than 80 percent by weight cellulosic fibers, greater than 90 percent cellulosic fibers, and greater than 95 percent cellulosic fibers. In some embodiments, the filtration media contains less than 98 percent cellulosic fibers, less than 95 percent cellulosic fibers, less than 90 percent cellulosic fibers, less than 85 percent cellulosic fibers, or less than 80 percent cellulosic fibers. In various example implementations the filtration media contains from 70 to 98 percent cellulosic fibers, in other implementations the filtration media contains from 75 to 95 percent cellulosic fibers, in yet other implementations the filtration media contains from 80 to 90 percent cellulosic fibers, in other implementations the filtration media contains from 85 to 90 percent cellulosic fibers.

In certain embodiments, the fiber composition includes some synthetic fibers in addition to cellulosic fibers. The synthetic fibers can add various performance and handling features, including improved strength and water resistance. Suitable synthetic fibers include, for example, various organic polymers. A particularly suitable synthetic fiber suitable for combination with the cellulose is polyester fiber.

The filtration media will often contain less than 5 percent synthetic fibers by weight, in some implementations less than 7.5 percent synthetic fibers by weight, or less than 10 percent synthetic fibers by weight. In alternative implementations the synthetic fibers will comprise less than 15 percent, or in the alternative less than 20 percent, of the filtration media by weight.

Glass fibers can be incorporated into the media, but are typically disfavored. Although glass fibers can provide improved strength and efficiency, the glass fibers often make it more difficult to form structured flutes with sharp flute peaks and ridges between adjacent flute peaks. Therefore, when glass fiber is incorporated into the media, it is typically incorporated at levels of less than 20 percent, more desirably less than 15 percent, and even more desirably less than 10 or 5 percent by weight of the fiber.

A resin is sometimes added to the filtration media to improve media formation and use. Suitable resins include non-aqueous resins, such as phenolic resins. The resin content of the media is optionally less than 18% by weight of the media. Example implementations have less than 20 percent by weight resin, less than 22 percent by weight resin, and less than 24 percent by weight resin. In some implementations the resin content is at least 5 percent by weight of the media, alternatively at least 10 percent by weight of the media, optionally at least 15 percent by weight of the media, and in the alternative at least 12 or 14 percent by weight of the media. Ranges for resin content, by weight of the media, include from 5 to 24 percent, from 10 to 22 percent, from 12 to 20 percent, and from 14 to 18 percent. In example embodiments the resin content of the media is from 15 to 22 percent by weight.

The air filtration media typically has a relatively low solidity. The low solidity provides various advantages, including the ability to coin or otherwise compress small areas of the media to form shapes. For example, the flute peaks and ridges can more easily be formed with lower solidity media because the media is more readily compressed to form the location for the bends in the media defining the sharp flute peaks and ridges.

The solidity is less than 30 percent in some embodiments. Solidity is generally less than 35 percent, more frequently less than 40 percent, optionally less than 45 percent, and usually less than 50 percent. Solidity is typically greater than 15 percent, often greater than 20 percent, optionally greater than 25 percent. In example embodiments solidity is from 15 to 50 percent, alternatively from 20 to 40 percent, or from 20 to 30 percent.

The filtration media usually has a relatively low basis weight of less than 60 pounds per 3000 square feet. Basis weights are typically less than 90 pounds per 3000 square feet, normally less than 80 pounds per 3000 square feet, and often less than 70 pounds per 3000 square feet. In example implementations the basis weight can be less than 50 pounds per 3000 square feet. Specific embodiments have a basis weight of less than 45 pounds per 3000 square feet. The basis weight in certain constructions is from 30 to 90 pounds per 3000 square feet, optionally from 40 to 80 pounds per 3000 square feet, or from 50 to 70 pounds per 3000 square feet.

In order to provide a relatively low resistance to air flow, it is desirable that the media have a relatively high perm. The filtration media may have, for example, a perm of at least 25 feet per minute. In some embodiments the filtration media has a perm of at least 15 feet per minute, in other implementations at least 20 feet per minute. Filtration media perm can also include, in example implementations, greater than 20 feet per minute, greater than 25 feet per minute, and greater than 30 feet per minute.

The media is generally constructed so as to be relatively thin, so as to allow dense packing within filter elements and desirable flute formation properties. In an example implementation the media has an average thickness of less than 0.012 inches. In the alternative the media has an average thickness of less than 0.014 inches, in the alternative the filtration media has an average thickness of less than 0.016 inches, less than 0.020 inches, or less than 0.022 inches. In some implementations the media may have a thickness of less than 0.110 inches, or less than 0.010 inches. Suitable media can have thicknesses of greater than 0.006 inches, greater than 0.008 inches or greater than 0.010 inches. Ranges of example media thicknesses include, for example, 0.006 to 0.014 inches, from 0.006 to 0.012 inches, and from 0.008 to 0.15 inches.

In example implementations the media has a pressure drop of no more than 350 Pa for a dust loading of 30 mg/cm$^2$ when tested with SAE fine dust at a concentration of 200 mg/m3 and a face velocity of 5 cm/sec. In the alternative, the media has a pressure drop of no more than 500 Pa for a dust loading of 30 mg/cm$^2$ when tested with SAE fine dust at a concentration of 200 mg/m3 and a face velocity of 5 cm/sec. In example implementations, the media has a pressure drop of no more than 200 Pa for a dust loading of 30 mg/cm$^2$ when tested with SAE fine dust at a concentration of 200 mg/m3 and a face velocity of 5 cm/sec.

The media desirably has a removal efficiency of no less than 20 percent for 0.78 micron latex particles at a face velocity of 20 feet/minute (6.1 m/min) when tested according to ASTM-1215-89. In certain embodiments the media has a removal efficiency of no less than 30 percent for 0.78 micron latex particles at a face velocity of 20 feet/minute (6.1 m/min) when tested according to ASTM-1215-89. Optionally, the media has a removal efficiency of no less than 40 percent for 0.78 micron latex particles at a face velocity of 20 feet/minute (6.1 m/min) when tested according to ASTM-1215-89.

In certain implementations the filtration media comprises a blend of fibers having a basis weight of 81% to 87% of a basis weight of the media, and a resin binder having a basis weight of 13% to 19% of the basis weight of the media. The blend of fibers can contain, for example, cellulose fibers having a basis weight of about 82.5% to about 96% of the basis weight of the media, and synthetic fibers having a basis weight of about 4% to about 17.5% of the basis weight of the media. Such media is disclosed in U.S. patent application Ser. No. 13/829,572, filed Mar. 14, 2013, entitled "Filtration Media", and incorporated herein by reference in its entirety.

Media Elements

The filtration media is suitable for incorporation into media packs for air filtration, and the media packs can be formed into media elements. In an example implementation, an air filtration media pack includes a plurality of layers of single facer media. A layer of single facer media comprises a fluted sheet, a facing sheet, and a plurality of flutes extending between the fluted sheet and the facing sheet and having a flute length extending from a first face of the filtration media pack to a second face of the filtration media pack.

A first portion of the plurality of flutes are closed to unfiltered air flowing into the first portion of the plurality of flutes, and a second portion of the plurality of flutes are closed to unfiltered air flowing out of the second portion of the plurality of flutes so that air passing into one of the first face and the second face of the media pack and out the other of the first face and the second face of the media pack passes through media to provide filtration of the air.

The fluted sheet includes repeating internal peaks facing toward the facing sheet and repeating external peaks facing away from the facing sheet. In addition, the fluted sheet includes a repeating pattern of flutes comprising flutes having at least one ridge extending along at least a portion of the flute length between an internal peak and an adjacent external peak. Preferably, the repeating pattern of flutes comprises flutes having at least one ridge extending at least 50% of the flute length between an internal peak and adjacent external peak.

The repeating pattern of flutes can comprise any number of flutes where the pattern repeats itself. The number of flutes can include one flute, two flutes, three flutes, four flutes, etc. At a location within the repeating pattern, there is at least one ridge extending between an internal peak and an adjacent external peak. In some implementations a ridge extends between every internal peak and adjacent external peak. A repeating pattern may include flutes or portions of flutes that do not include a ridge extending between an internal peak and an adjacent external peak.

In the case where the fluted sheet includes a flute having a ridge extending between an internal peak and an adjacent external peak for a flute period, that flute period can be referred to as having a "low contact" shape. When the fluted sheet includes two ridges extending between an internal peak and an adjacent external peak for a flute period, the shape of the flute period can be referred to as "zero strain." While it is desirable to provide a ridge extending between every adjacent peak, that is not necessary. In some implementations the repeating pattern has one or more ridges extending between adjacent peaks, and one or more area between adjacent peaks that do not include a ridge.

To obtain the benefit of having a ridge extend between adjacent peaks, it can be desirable to have the ridge extend a length of at least 20 percent of the flute length. Optionally, the ridge extends at least 40 percent of the flute length, at least 50 percent of the flute length, or at least 80 percent of the flute length.

An air filtration media pack is provided according to the present invention that can be characterized as z-media containing flutes wherein the flutes contain an enhanced amount of media between adjacent flutes. Techniques for characterizing the amount of filtration media between adjacent peaks include reference to a cord-media percentage and reference to a flute width height ratio. The cord-media percentage can be at least about 6.2 percent and the flute width height ratio can be greater than about 2.2 or less than about 0.45. In addition, the filtration media pack can be characterized as having a volume on one side of the media pack that is greater than a volume on another side of the media pack by at least 10 percent and wherein the flute width height ratio can be greater than about 2.2 or less than about 0.45.

A fluted media sheet is provided according to the present invention. The fluted media sheet includes a repeating pattern of flutes comprising internal peaks and external peaks. The repeating pattern of flutes includes at least one ridge extending along at least 50% of a flute length between an internal peak and an adjacent external peak. The media comprises a cellulose based media for fluid filtration.

The performance of the filtration media can be enhanced by modifying the flute shape. Providing a flute shape that increases the amount of filtration media available for filtration can increase performance. One technique for increasing the amount of filtration media available for filtration is by creating a ridge between adjacent peaks. As discussed previously, "adjacent peaks" refers to an internal peak (facing toward the facing sheet) and an external peak (facing away from the facing sheet).

Figure 1:
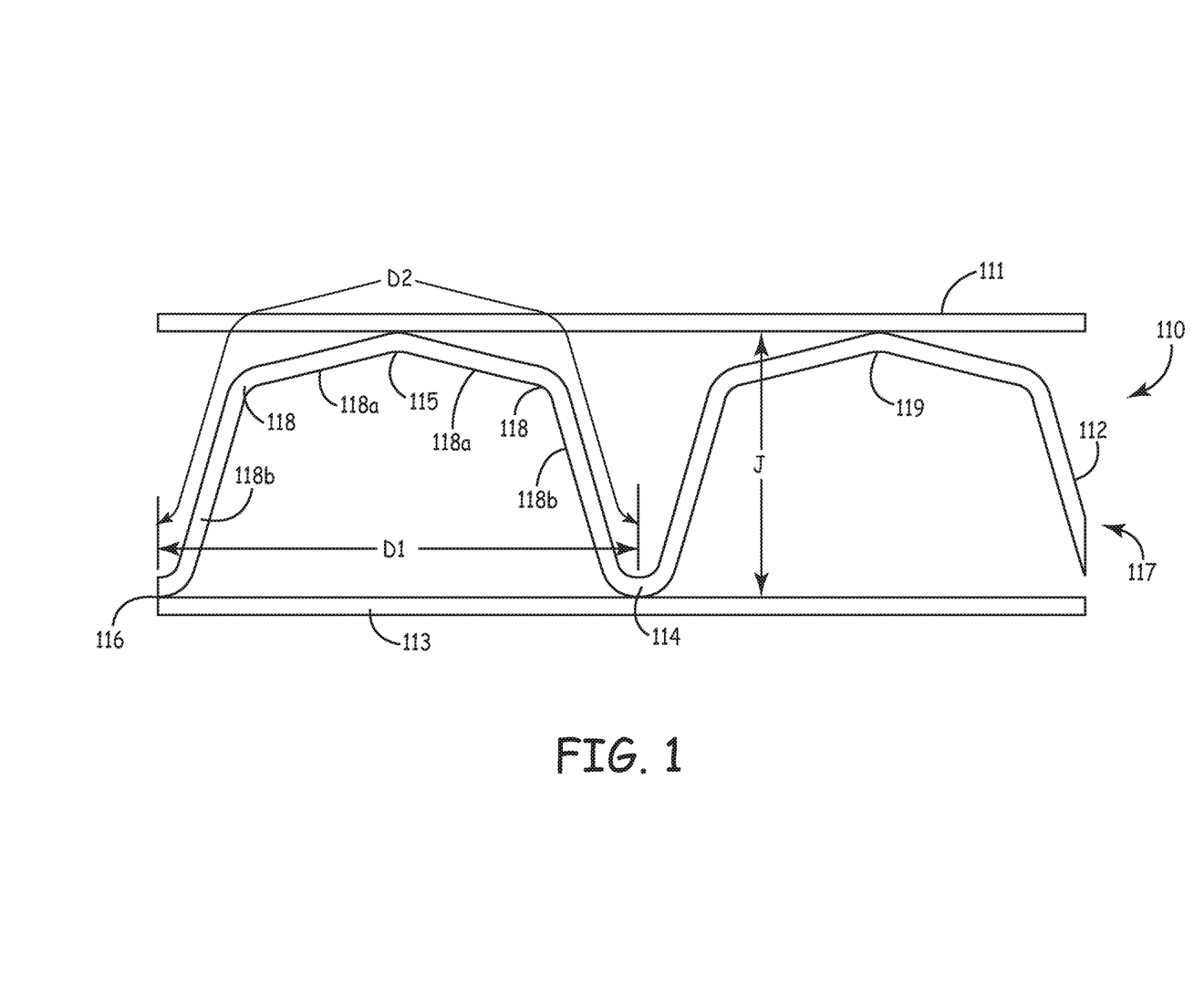
FIG. 1 is an enlarged cross sectional representation of a fluted media construction made in accordance with an implementation of the invention.

Now referring to the drawings, FIG. 1 shows media 110 with fluted sheet 112 between facing sheets 111 and 113. The media includes fluted sheet 112 between facing sheets 111 and 113. The combination of the fluted sheet 112 and the facing sheet 113 can be referred to as a single facer media 117. When the single facer media 117 is coiled or stacked, the facing sheet 111 can be provided from another single facer media in the case of stacked media or from the same single facer media in the case of coiled media.

The media can be arranged to provide filter elements for cleaning a fluid such as air. The filter elements can be arranged as coiled elements or stacked elements. Coiled elements generally include a fluted media sheet and a facing media sheet that is wound to provide the coiled construction. The coil construction can be provided having a shape that is characterized as round, obround, or racetrack. A stacked construction generally includes alternating layers of media comprising fluted media sheets adhered to facing media sheets. The media 110 in FIG. 1 is a sectional view taken across the media to show the cross-sectional shape of the fluted sheet for the described shapes. It should be understood that the cross-sectional shape can be provided extending along a length of the flute. Furthermore, the flutes can be closed or sealed so that the media functions as z-media. The closure or seal can be provided, if desired, as an adhesive or sealant material.

In FIG. 1, the distance D1 is measured from the center point of the peak 114 to the center point of the peak 116. The fluted media 110 is shown having two ridges 118 for each period length D1, or along the media length D2. The ridges 118 are provided extending along at least a portion of the length of the flute. In general, each ridge 118 can be characterized as a general area where a relatively flatter portion of the fluted media 118a joins a relatively steeper portion of the fluted media 118b. A ridge (e.g., a non-peak ridge) can be considered a line of intersection between differently sloped media portions. A ridge can be formed as a result of deformation of the media at that location.

The media can be deformed at the ridge as a result of applying pressure to the media. Techniques for forming the ridge include coining, creasing, bending, and folding. Preferably, the ridge can be provided as a result of coining during a corrugation process where the corrugation rolls apply pressure to the media to form the ridge. An exemplary technique for forming the fluted sheet and the single spacer media is described in U.S. Pat. No. 7,959,702, incorporated herein by reference in its entirety.

For the exemplary fluted sheet 112, the relatively flatter portion of the fluted media 118a can be seen in FIG. 1 as the portion of the fluted media extending between the external peak 115 and the ridge 118. The average angle of the relatively flatter portion of the fluted media 118a from the external peak 115 to the ridge 118 can be characterized as less than 45°, and can be provided as less than about 30° relative to the facing sheet 113. The relatively steeper portion of the fluted media 118b can be characterized as that portion of the media extending from the peak 116 to the ridge 118.

In general, the angle of the relatively steeper portion of the fluted media 118b, as characterized as extending between the peak 116 and the ridge 118 can be greater than 45° and can be greater than about 60° relative to the facing sheet 113. It is the difference in angle between the relatively flatter portion of the fluted media 118a and the relatively steeper portion of the fluted media 118b that can characterize the presence of the ridge 118. It should be understood that the angle of the relatively flatter portion of the fluted media 118a and angle of the relatively steeper portion of the fluted media 118b can be determined as the average angle between the points that form the end points of the section of the media, and the angle is measured from the facing sheet.

The ridge 118 can be provided as a result of coining, creasing, bending, or folding along a length of the fluted sheet 112 during the formation of the fluted media 12. It may be desirable, but it is not necessary, during the step of forming the fluted media 112 to take steps to set the ridge 118. For example, the ridge 118 can be set by heat treatment or moisture treatment or a combination thereof. In addition, the ridge 118 can exist as a result of coining, creasing, bending, or folding to form the ridge without an additional step of setting the ridge.

Furthermore, the characterization of a ridge 118 is not to be confused with the fluted sheet external peaks 115 or 119 and the fluted sheet internal peaks 116 or 114. The characterization of a generally flatter portion 118a and a generally steeper portion 118b is intended as a way to characterize the presence of a ridge. In general, it is expected that the flatter portion 118a and the steeper portion 118b will exhibit a curve. That is, it is expected that the flatter portion 118a and the steeper portion 118b will not be completely planar, particularly as fluids such as air flows through the media during filtration. Nevertheless, the angle of the media can be measured from the ridge to the corresponding, adjacent peak to provide the average angle of that portion of the media.

The shape of the media depicted in FIG. 1 can be referred to as a low contact shape. In general, the low contact shape refers to the relatively low area of contact between the fluted sheet 112 and the facing sheet 111. The presence of the ridge 118 helps provide for reduced masking at the peaks 115 and 119. The ridge 118 exists as a result of deforming the fluted sheet 112 and, as a result, reduces the internal stress on the media at the peaks 115 and 119. Without the presence of the ridge 118, there would likely exist a level of internal tension in the fluted sheet 112 that would cause the fluted sheet 112 to create a greater radius at the peaks 115 and 119, and thereby increase masking. As a result, the presence of the ridge 118 helps increase the amount of media present between adjacent peaks (e.g., peaks 115 and 114) and helps decrease the radius of a peak (e.g., peak 115) as a result of relieving, to a certain extent, the tension within the fluted sheet 112 that would cause it to expand or flatten out at the peaks in the absence of the ridge.

Figure 2:
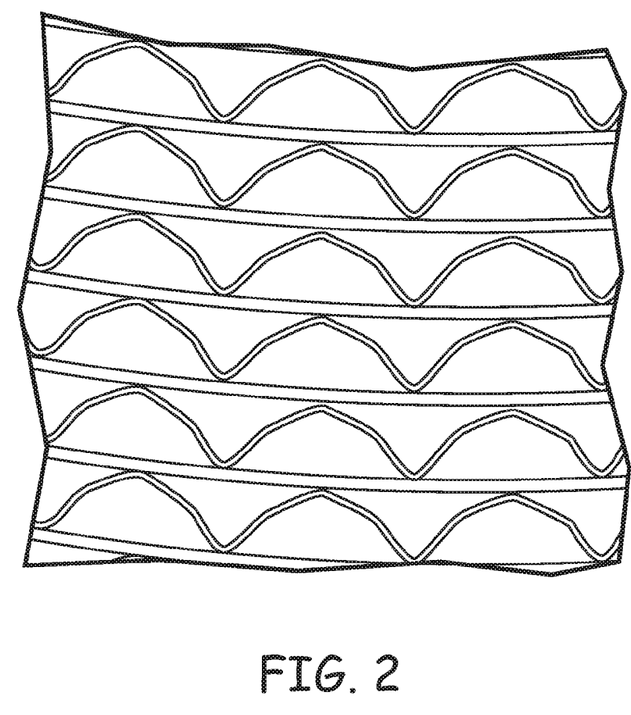
FIG. 2 is a photograph of a cross sectional end view of a filter media pack containing structured flutes.
Figure 3:
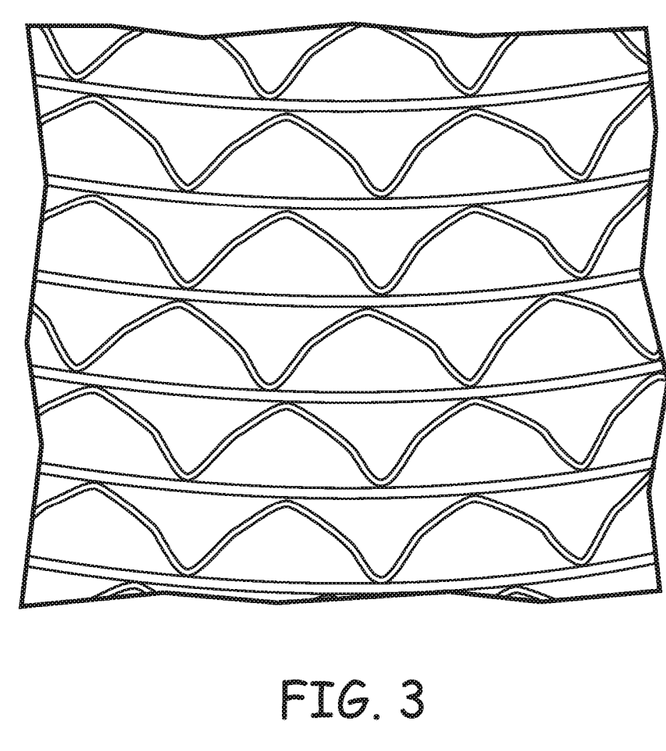
FIG. 3 is a photograph of a cross sectional end view of a filter media pack containing structured flutes, the filter media pack constructed in accordance with an implementation of the invention.

FIGS. 2 and 3 are photographs of a cross section of filter media packs containing structured flutes. In FIG. 2 and FIG. 3 the media packs both contain structured flutes with ridges. However, in FIG. 3 the flutes display ridges more clearly, the ridges consistent with the present invention.

The present invention is also directed, in part, to pleated filtration media and filtration media pleat packs that contain flutes extending between the pleat folds similar to those shown in FIG. 1, but without facer sheets 111 or 113. The flutes are three dimensional structures formed in the filtration media that provide advantageous flow paths along the pleat surfaces, allow for advantageous flow of fluids through the media, and provide for efficient contaminant removal. Thus, the pleated media containing flutes is structured so as to provide improved filtration performance under certain conditions.

Advantages of pleated media containing flutes include, for example, the ability to reduce contact between media surfaces while preserving media integrity and performance; the ability to create media packs with different open areas or volumes on the upstream and downstream portions (thereby affecting performance of some media arrangements), the ability to have high pleat counts while preserving filtration performance, and/or the ability to make relatively compact, efficient, filter elements.

More specifically, in certain embodiments, fluted media made in accordance with teachings of the present invention can significantly diminish masking between layers of pleated media, while also promoting efficient flow of fluids through the media. The flutes formed in the media typically have peaks where each flute can make contact with opposed pleat surfaces, which generally also have flutes with peaks. The flute peaks will contact one another in some embodiments along some or all of the length of the flute, but in other implementations the flute peaks will not come in contact with other flutes or flute peaks.

The flute peaks are typically characterized by a sharp radius or a defined tip that reduces masking between pleats. As used herein, masking refers to the area of proximity between the media sheets where there is a lack of substantial pressure difference across the media. In general, masking is experienced at the location in the media where there is close proximity or contact to another media sheet or flow bounding surface. This close proximity can result in resistance to flow through the media at that location. As a result, masked media is not useful to the filtration performance of filtration media.

Accordingly, it is desirable to reduce masking so as to increase the amount of filtration media available for filtration. Reduction in masking increases the dust storage capacity of the filtration media pleat pack, increases the throughput of fluids through the filtration media for a given pressure drop, and/or decreases the pressure drop of the filtration media pleat pack for a given overall fluid flow rate. Flutes in the pleated media made in accordance with the teachings of the present invention allow for a reduction in masking of the media. This reduction in masking occurs in large part as a result of creating flute peaks, and changing their shape and location, as described herein. For example, in some embodiments of the invention the flute peaks have tips that extend beyond the general profile of the adjacent flute.

Specific further structural aspects of the flutes include, in some embodiments, ridges running along all or part of the lengths of the flutes. As used herein, a ridge is generally a defined bend, crease, or deformation in the media along some or all of the length of a flute. More specifically, a ridge can be a region of transition between substantially differently sloped media portions within the profile of a section of fluted media. The transition is typically relatively abrupt. Under normal usage, ridges do not contact ridges from other adjacent pleats. Under normal usage, ridges occur between peaks, but ridges are not peaks. Ridges promote efficiency of fluid flow and filtration through the media packs by allowing customization and optimization of the cross sectional area of the flutes, increases in the amount of media within a specific volume, and aids in reduction of masking between flutes on opposed media surfaces. The use of ridges in the pleated media can actually result in increased amounts of effective or usable media while having reduced masking.

In certain embodiments the filtration media pleat packs are constructed with flutes that have different channel shapes and different open volumes on the upstream and downstream sides of the pleats in filtration media pleat packs, a property referred to herein as pleat pack volumetric asymmetry. This pleat pack volumetric asymmetry can, in some embodiments, promote contaminant material storage, flow and filtration. Pleat pack volumetric asymmetry can be particularly helpful for improving performance in filter configurations that have shallow pleat packs.

One advantage of the present invention is that the flute geometries, typically including flute height, flute width, sharp flute peaks and optionally one or more ridges along the flutes, allow for greater amounts of overall media surface area to be included in filtration media pleat packs, and reduced overall masked surface area within pleat packs. This provides the capability to increase filter performance without increasing filter element size. The flute designs of the present invention allow for increases in media while actually reducing masking, a combination that produces excellent performance results.

The three dimensional structure of flutes defines open volumes upstream and downstream of the media for flow of fluid, as well as space for contaminants (such as dust) to accumulate. In some embodiments the filtration media exhibits a media volume asymmetry such that an open volume on one side of the media is greater than an open volume on the other side of the media. These volumes can extend from an upstream face to downstream face of the pleat pack.

In some but not all implementations, the larger media volume corresponds to the upstream open media volume, and the smaller media volume corresponds to the downstream open media volume (during use the open volume may accumulate contaminants, such as dust). In some implementations media will demonstrate a media volume asymmetry of more than 1 percent, more than 3 percent, more than 5 percent, or more than 10 percent. Example media constructions demonstrate a media volume asymmetry of greater than 15 percent, greater than 20 percent, greater than 50 percent, greater than 75 percent, greater than 100 percent, greater than 150 percent, and greater than 200 percent. Suitable media volume asymmetry ranges includes, for example, 1 percent to 300 percent, 5 percent to 200 percent; 50 percent to 200 percent; 100 percent to 200 percent; and 100 percent to 150 percent.

In addition to media volume asymmetry, the media may also demonstrate media cross-sectional area asymmetry, which is calculated based upon a cross-section of the media. It will be understood that cross-sectional area asymmetry will often lead to differences in media volume asymmetry, but this is not always the case because cross sectional areas can be varied along the length of the pleat so as to have a cumulative effect that the total volume on each side of the media is equal.

The differences in cross sectional area are controlled by the geometry of the flute design. Often the presence, number, and shape of ridges along the flutes significantly impacts, and often determines, the amount of cross sectional area asymmetry. Flute geometry that results in differences in cross sectional area can significantly impact flow properties through the flutes. Changes in relative cross sectional area of flutes typically results in changes in the cross sectional area of the upstream and downstream portion of the media pack in that area. The present invention allows for customization of media volume asymmetry and cross-sectional area asymmetry to improve filter performance.

In some embodiments the media will have a cross-sectional area asymmetry such that one side of the media has cross sectional area at least 1 percent greater than the opposite side the same piece of media. Often the difference in cross-sectional area across the media will be more than 3 percent, more than 5 percent, or more than 10 percent.

Example media constructions demonstrate a media cross sectional area asymmetry of greater than 15 percent, greater than 20 percent, greater than 50 percent, greater than 75 percent, greater than 100 percent, greater than 150 percent, and greater than 200 percent. Suitable media cross sectional area asymmetry ranges includes, for example, 1 percent to 300 percent, 5 percent to 200 percent; 50 percent to 200 percent; 100 percent to 200 percent; and 100 percent to 150 percent.

Media Production

Filtration media made in accordance with the present disclosure can be produced on fourdrinier papermaking machines, cylindrical papermaking machines, inclined papermaking machines, combination papermaking machines and other machines that can take a properly mixed furnish, form a layer or layers of the furnish components, and remove the fluid aqueous components to form a wet sheet.

In an example, the media is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid.

In certain embodiments, after liquid is removed, dispersed fibers in formed material (also known as base media) are bonded by entanglement and by hydrogen bonding on contact points of cellulose fibers. Polyester synthetic fiber may also create additional bonding due to the melting of thermoplastic material during the drying process. Certain additives such as wet strength resins added in the furnish also create additional bond points in the media. The formed and dried material (base media) is then impregnated with solvent based phenolic resin either by passing over set of gravure rolls or through one or more pans of solution. During this process cellulose fibers are impregnated by solid content of the resin system. The solvent is then evaporated by convection or direct contact drying mechanism. The formed material also known as impregnated media after this process. Resin impregnation further increases the strength properties in dry and wet conditions. Resin impregnation also increases the resistance against moisture and other aqueous solutions.

Media Shape Retention

Figure 4:
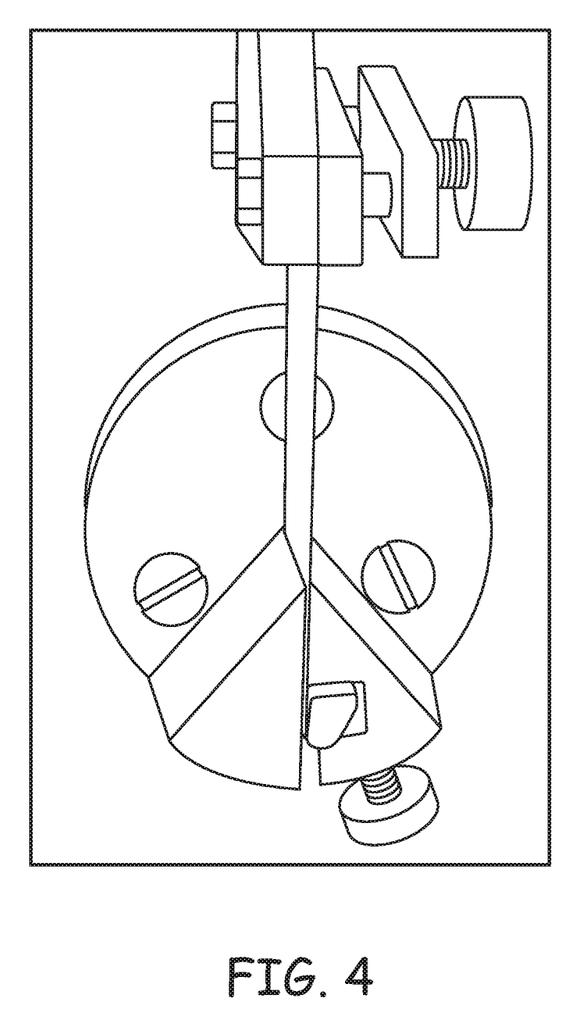
FIG. 4 is a photograph of a media fold retention test device used to fold media samples for fold retention testing, shown with media inserted into the test device but before folding the media.
Figure 5:
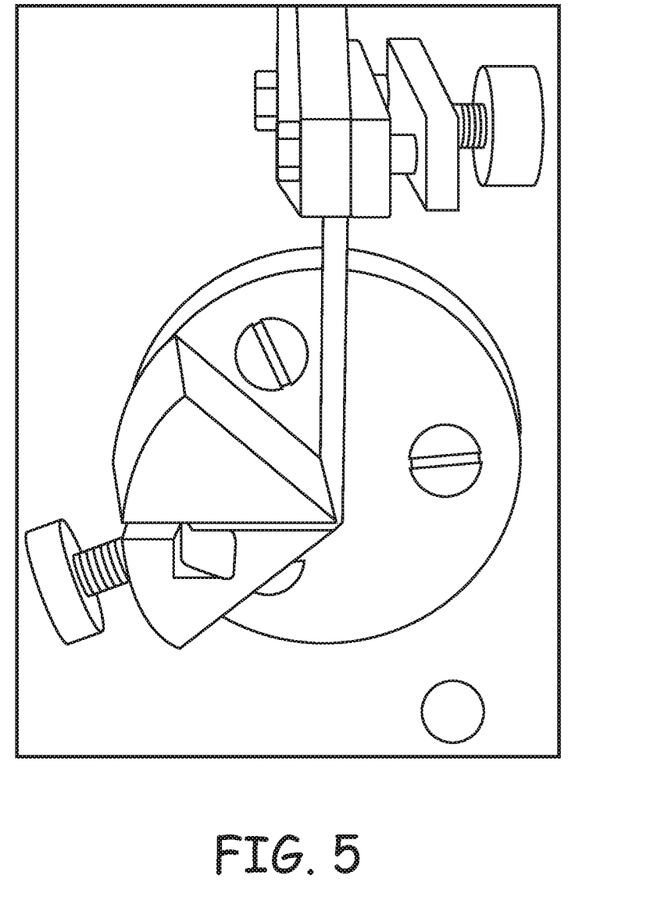
FIG. 5 is a photograph of a portion of a media fold retention test device used to fold media samples for fold retention testing, shown with media inserted into the test device and the media folded.
Figure 6:
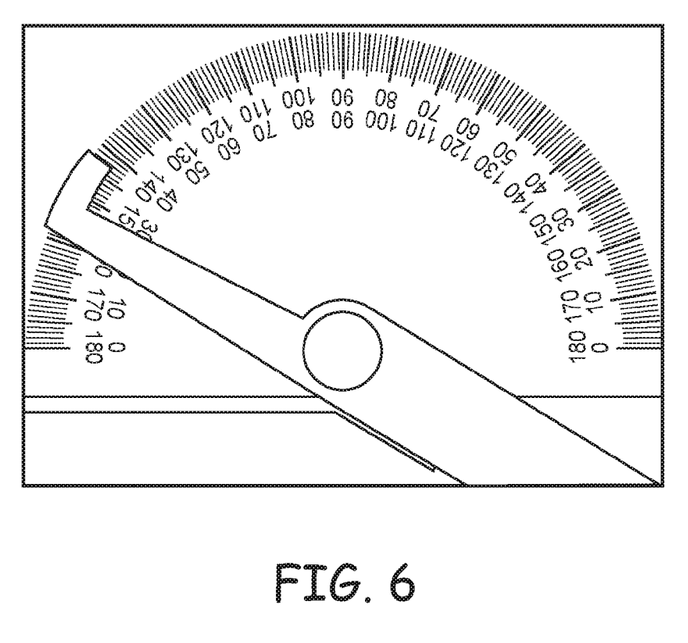
FIG. 6 is a photograph of a folded media measured against a protractor.

In order to test the property of retention of formed shapes, air filtration media samples were subjected to a fold endurance test. FIG. 4 shows a photograph of a fold endurance test machine. The fold endurance test machine was outfitted with a 2 pound weight, and 15 millimeter wide samples of media were loaded into sample clamps such that the felt side was toward the interior of the fold, as shown in FIG. 5, the media was manually folded 90 degrees, as shown in FIG. 6, The sample was then removed from sample clamps, at which time a baseline angle was measured immediately after the sample was removed. The sample was subsequently kept at 50% relative humidity and 70° Fahrenheit for 48 hours, at which point the angle was again measured. The results are shown below in Table 1.

TABLE 1

| Media Sample | Composition | | | Basis Weight (lb/3000 ft2) | Thickness (mils) | Solidity (%) | Percent of 90 degree fold retained after 48 hrs | Percent angle increase from initial |
|---|---|---|---|---|---|---|---|---|
| | Cellulose | Synthetic (polyester) | Glass | | | | | |
| Sample A | 90 | 10 | 0 | 43 | 12.5 | 18 | 31.1 | 3.1 |
| Sample B | 100 | 0 | 0 | 51 | 12 | 21 | 30.6 | 6.6 |
| Sample C | 100 | 0 | 0 | 59 | 14.5 | NM | 25.6 | 7.1 |
| Sample D | 55 | 45 | 0 | 52 | 13 | NM | 20.7 | 5.9 |
| Sample E | 0 | 70 | 30 | 83 | 22.5 | NM | 5.6 | 3.6 |
| Sample F | 0 | 55 | 45 | 82 | 27 | NM | 3.3 | 2.1 |
| Sample G | 0 | 70 | 30 | 67 | 21 | NM | 6.7 | 2.4 |

The parameter "percentage of the 90-degree fold retained by the media" was measured following the 48 hour hold. A measured angle of 90 degrees would have 100% retention and a measured angle of 180 degrees would have 0% retention. The parameter "the percentage relaxation from the initial measured angle after the 48 hour hold" was determined by dividing the change in angle after 48 hours by the initial measured angle of the media.

Solidity was measured by performing a solvent extraction of resin from the medium to determine resin density. The percent resin, density of media (calculated from basis weight and thickness), density of the resin, and density of the fibers was used. TGA was used to determine relative quantities of the materials in the medium. Literature values for densities of fiber components was used, and the values were analyzed using the following equation:

$$\text{Solidity \%} = \frac{100}{\dfrac{1}{\dfrac{\rho_{media}}{\dfrac{\text{Binder \%}}{100}\Big/\rho_{binder} + \dfrac{100 - \text{Binder \%}}{100}\Big/\rho_{fiber}}}}$$

As can be observed from Table 1, Sample A vastly outperformed all of the other media samples except for Sample B when it comes to the percentage of the 90-degree fold retained. Sample A was 90 percent cellulose, 10 percent synthetic, and 0 percent glass. Sample B still does not retain as much of the fold as Sample A, but they are very close. However, the Sample A media was found to relax by 3.1% after 48 hours, while the Sample B media was found to relax by 6.6%, more than double the Sample A media relaxation.

Filtration Performance

Filter elements constructed in accordance with the present invention were tested for dust loading capacity. The elements were formed into round elements in a first comparative test, and rectangular elements in a second comparative test.

Figure 7:
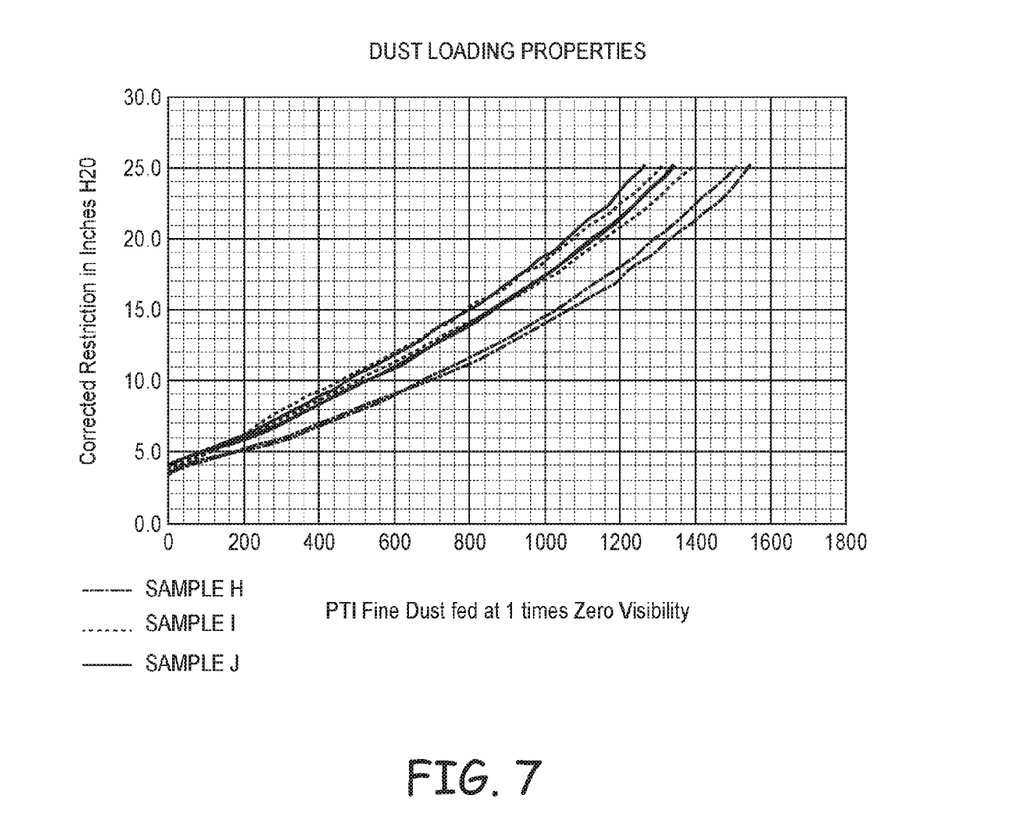
FIG. 7 is a chart showing relative filter media performance of various media constructions.

FIG. 7 shows dust loading properties of a 10" round element constructed using various alternative media materials. As is evident from FIG. 8, the sample H, made in accordance with the present invention, had improved performance over alternative samples, including Sample I and Sample J. Three elements were tested for each sample design.

Figure 8:
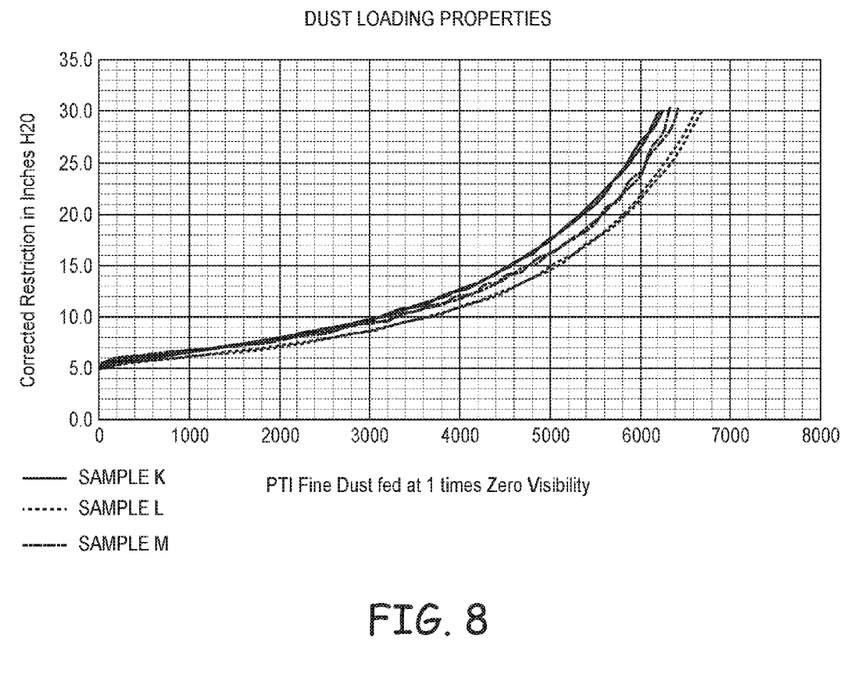
FIG. 8 is a chart showing relative filter media performance of various media constructions.

FIG. 8 shows dust loading properties of an element constructed using various media materials. As is evident from FIG. 8, the Sample L, made in accordance with the present invention, had improved performance over alternative samples, including alternatives Sample K and Sample M. Three elements were tested for each sample design.

The above specification provides a complete description of the present invention. Since many embodiments of the invention can be made without departing from the spirit and scope of the invention, the invention resides in the claims hereinafter appended.

We claim:

1. A cleaner for removing contaminants from a gas stream, the cleaner comprising:
   (a) a housing configured to retain an air filtration media pack; and
   (b) an air filtration media pack, the media pack comprising:
      (i) a plurality of layers of single facer media wherein the layer of single facer media comprising a fluted sheet, a facing sheet, and a plurality of flutes extending between the fluted sheet and the facing;
      (ii) a first portion of the plurality of flutes being closed to unfiltered air flowing into the first portion of the plurality of flutes, and a second portion of the plurality of flutes being closed to unfiltered air flowing out of the second portion of the plurality of flutes so that air passing into one of the first face or the second face of the media pack and out the other of the first face or the second face of the media pack passes through media to provide filtration of the air; and
      (iii) wherein the fluted sheet comprises:
         (a) a plurality of repeating internal peaks facing toward the facing sheet and repeating external peaks facing away from the facing sheet, said plurality of internal and external peaks comprising sharp contact points with adjacent facing sheets;
         (b) an air filtration media layer, the air filtration media layer comprising a fiber composition wherein at least 80 percent of the fibers by weight are cellulose fibers; and wherein the air filtration media layer has:
            a solidity of less than 20 percent, and
            a basis weight of less than 45 pounds per 3000 square feet.

2. The cleaner for removing contaminants from a gas stream of claim 1, wherein the fiber composition further comprises no more than 10 percent synthetic fibers by weight.

3. The cleaner for removing contaminants from a gas stream of claim 2, wherein the synthetic fibers comprise polyester fibers.

4. The cleaner for removing contaminants from a gas stream of claim 1, wherein the fiber composition comprises at least 90 percent cellulose fibers by weight.

5. The cleaner for removing contaminants from a gas stream of claim 1, wherein the media has a perm of at least 25 feet per minute.

6. The cleaner for removing contaminants from a gas stream of claim 1, wherein the media has a thickness of less than 0.012 inches.

7. The cleaner for removing contaminants from a gas stream of claim 1, the further comprising a resin wherein the resin content of the media less than 22 percent by weight.

8. The cleaner for removing contaminants from a gas stream of claim 1, the media further comprising a resin wherein the resin content of the media is 15 to 22 percent by weight.

9. The cleaner for removing contaminants from a gas stream of claim 7, wherein the resin comprises a non-aqueous resin.

10. The cleaner for removing contaminants from a gas stream of claim 7, wherein the resin comprises a phenolic resin.

11. The cleaner for removing contaminants from a gas stream of claim 1, wherein the media has a pressure drop no more than 350 Pa for a dust loading of 30 mg/cm2 when tested with SAE fine dust at a concentration of 200 mg/m3 and a face velocity of 5 cm/sec.

12. The cleaner for removing contaminants from a gas stream of claim 1, wherein the media has a removal efficiency no less than 20 percent for 0.78 micron latex particles at a face velocity of 20 feet/minute (6.1 m/min) when tested according to ASTM-1215-89.

13. The cleaner for removing contaminants from a gas stream of claim 1, wherein the media shows at least 10 percent fold retention after 24 hours.

14. A cleaner for removing contaminants from a gas stream, the cleaner comprising:
   (a) a housing configured to retain an air filtration media pack; and
   (b) an air filtration media pack, the media pack comprising:
      (i) filtration media having a first set of pleat folds forming a first face, a second set of pleat folds forming a second face, and wherein the filtration media extends between the first set of pleat folds and the second set of pleat folds in a back and forth arrangement;
      (ii) at least a portion of the filtration media extending between the first set of pleat folds and the second set of pleat folds comprises flutes forming first flute peaks and second flute peaks,
         1) wherein the flutes extend directionally from the first set of pleat folds toward the second set of pleat folds, and
         2) wherein at least 25 percent of the flutes in the pleated filtration media pack comprise at least one ridge between adjacent flute peaks, the ridges extending along at least 25 percent of the flute length between the first set of pleat folds and the second set of pleat folds;
      wherein the air filtration media comprises a media layer wherein at least 80 percent of the fibers by weight are cellulose fibers and the media layer has:
         a solidity of less than 20 percent, and
         a basis weight of less than 45 pounds per 3000 square feet.

15. The cleaner for removing contaminants from a gas stream of claim 14, wherein the fiber composition further comprises no more than 10 percent synthetic fibers by weight.

16. The cleaner for removing contaminants from a gas stream of claim 15, wherein the synthetic fibers comprise polyester fibers.

17. The cleaner for removing contaminants from a gas stream of claim 14, wherein the fiber composition comprises at least 90 percent cellulose fibers by weight.

18. The cleaner for removing contaminants from a gas stream of claim 14, wherein the media has a thickness of less than 0.012 inches.

19. An air filtration media pack comprising:

a) filtration media having a first set of pleat folds forming a first face, a second set of pleat folds forming a second face, and wherein the filtration media extends between the first set of pleat folds and the second set of pleat folds in a back and forth arrangement;

(b) at least a portion of the filtration media extending between the first set of pleat folds and the second set of pleat folds comprises flutes forming first flute peaks and second flute peaks, i) wherein the flutes extend directionally from the first set of pleat folds toward the second set of pleat folds, and ii) wherein at least 25 percent of the flutes in the pleated filtration media pack comprise at least one ridge between adjacent flute peaks, the ridges extending along at least 25 percent of the flute length between the first set of pleat folds and the second set of pleat folds;

wherein the air filtration media comprises a media layer wherein at least 80 percent of the fibers by weight are cellulose fibers and the media layer has:

a solidity of less than 20 percent, and a basis weight of less than 45 pounds per 3000 square feet.

20. An air filtration media, the air filtration media comprising a fiber composition comprising an air filtration media layer wherein at least 80 percent of the fibers by weight are cellulose fibers; and wherein the air filtration media layer has:

(a) a solidity of less than 20 percent, and (b) a basis weight of less than 45 pounds per 3000 square feet.

* * * * *